United States Patent [19]
Buckley

[11] 3,816,161
[45] June 11, 1974

[54] GLASS-CERAMIC DECORATION

[75] Inventor: Michael J. Buckley, Brackenridge, Pa.

[73] Assignee: PPG Industries, Inc., Pittsburgh, Pa.

[22] Filed: Oct. 19, 1970

[21] Appl. No.: 82,165

[52] U.S. Cl. ............... 117/37 R, 117/124 T, 65/60
[51] Int. Cl. .......................... C03c 5/00, C03c 7/00
[58] Field of Search .......... 117/37, 124 T; 106/300; 65/60

[56] References Cited
UNITED STATES PATENTS

| | | | |
|---|---|---|---|
| 3,062,673 | 11/1962 | Wigginton | 106/300 |
| 3,266,912 | 8/1966 | Murphy | 117/124 C |
| 3,313,644 | 4/1967 | Morrissey | 117/37 |
| 3,428,513 | 2/1969 | Denman | 65/30 |
| 3,459,576 | 8/1969 | Smith | 106/300 |

Primary Examiner—Leon D. Rosdol
Assistant Examiner—M. F. Esposito
Attorney, Agent, or Firm—E. Kears Pollock

[57] ABSTRACT

An improved method for decorating glass-ceramic articles whereby high fidelity decorations having uniform color and sharply defined edges are integrated into the glass-ceramic crystal structure by contacting the articles with decorating pastes containing colorants and titanium dioxide having a crystal content of greater than 90 percent by weight anatase, the remainder rutile, and heating the combination to the crystallization temperature of the glass-ceramic.

6 Claims, No Drawings

GLASS-CERAMIC DECORATION

BACKGROUND OF THE INVENTION

This invention relates to the art of decorating ceramic articles. It more particularly relates to decorating articles made of ceramic materials known as glass-ceramics, which are semi-crystallized materials having glass-like compositions, but which are at least 50 percent crystalline with the crystals dispsersed in a glass matrix. Such articles are prepared by producing an uncrystallized or glassy article and crystallizing the material in the article to produce an article having an extremely low coefficient of thermal expansion. Glass-ceramics are described in detail in U.S. Pat. No. 2,920,971.

The art of decorating ceramic articles is an ancient one, with evidence that glazing of lustrous decorations onto ceramics was common in the Persian empire. A variety of ceramic decorating techniques have been developed during the long history of the art: ceramic colorants, particularly colored spinels, have been applied to ceramic articles over and under various glazes; ceramic colorants have also been applied as stains by causing integration of colorant into the crystal matrix of a ceramic by ion or atom migration. Elemental constituents of common colorants have included, aluminum, copper, cobalt, magnesium, nickel, chrome, strontium, barium, iron, calcium, manganese, zinc, palladium, and platinum. In decorating ceramic articles it has been the practice to dilute the active elemental colorants with a neutral or colorless diluent. Diluents are inert and merely lighten the resulting colors and control shrinkage of the stain designs. Typical diluents are silica, alumina, ground biscuit, and calcined kaolin.

Application of colored decorations to ceramics has been accomplished by mixing a colorant stain with a diluent and adding the mixture to a vehicle such as an oil and turpentine, gum and water, or glycerine and water then applying this combination to the surface of a ceramic article and firing the article to fix the color to the surface, drive off the volatiles, and oxidize any carbon in the vehicle. Methods for decorating glass-ceramic articles using colorant stains are described in U.S. Pat. No. 3,266,912 and No. 3,313,644.

With the recent development of glass-ceramic materials it has become desirable to decorate articles made from such materials. There is particularly a need to place durable patent markings on patented glass-ceramic articles, and there is a need to mark consumer products such as for the locations of heaters under flat surfaced glass-ceramic kitchen range tops. It has, however, been found that some difficulties arise when attempting to mark glass-ceramic articles according to the old methods for decorating ceramic articles including the teachings of the above-mentioned patents relating to decorating glass-ceramics.

Since ceramic decorating techniques require firing the decorated articles after application of a colorant and since the process for making glass-ceramic articles requires a heat treatment step after forming the articles, it is economical to combine these steps to require a single heat treatment, at about 1,600°F to about 2,000°F, to simultaneously apply the design and crystallize the glass-ceramic. Attempts to use decorating compositions which have been useful for ceramic decoration have resulted in less-than-satisfactory designs when decorating glass-ceramics using a single decoration and crystallization heating step. Colors have not been uniform or well controlled and resulting designs have been indistinct, having an "out-of-focus" appearance with halos or fringes of color extending about colored areas. Indistinct designs and nonuniform coloration have been particularly severe when subtle or light coloration is desired and diluent concentrations exceeding 90 percent are necessary. This problem has been recognized in the art as indicated at Col. 3, lines 23–27, U.S. Pat. No. 3,313,644.

SUMMARY OF THE INVENTION

It has been found that good designs may be integrated into glass-ceramics during crystallization heat treatment through the use of titanium dioxide having a predominant anatase crystal structure as the diluent of decorating compositions.

Excellent glass-ceramic designs are obtainable using a decorating procedure in which a colorant is mixed with anatase titanium dioxide (up to 10 percent by weight of the titanium dioxide may be the more stable, more common rutile) and added to a volatile liquid vehicle, such as a volatile oil or glycerin and water, to form a flowable paste which is applied to the surface of a glass-ceramic article by painting, printing or screening to form the desired design which is then integrated into the glass-ceramic by heating. While decorating may be done on articles which have earlier been crystallized, it is desirable to crystallize the glass-ceramic and integrate designs into the glass-ceramic in a single heating operation to minimize manufacturing costs.

Care must be exercised in selecting titanium dioxide to be used as a diluent to insure that an excessive amount of the rutile crystalline form is not present; preferably the rutile should not be present in excess of 10 percent by weight of the titanium dioxide. Titanium dioxide as anatase or octahedrite crystals in a tetragonal crystal system has a specific gravity of 3.82 to 3.95 and a molecular volume of 20.5; its color varies from brown to indigo-blue to black. Use of titanium dioxide, which is at least 90 percent by weight anatase, results in good decoration color and definition.

The undesired rutile may be identified as having prismatic or slender acicular crystals in a tetragonal system exhibiting subconchiodal to uneven fracture, and metallic-adamantine luster; it has a specific gravity of 4.18 to 4.25 and its color, usually reddish brown, is sometimes yellowish, bluish or black, and rarely green. The Brooklite form of titanium dioxide, which also is not preferred, may be identified as having an orthorhombic crystal form, a specific gravity of 4.0 and a color yellowish, reddish, brown or iron black.

Although the mechanism by which anatase titanium dioxide performs as a superior stain diluent is not fully understood, the following observations may be made. During crystallization of a glass-ceramic there is generally a significant volume contraction. Even during a heat treatment to decorate an already crystallized glass-ceramic article some further crystallization and slight shrinkage is likely for an article previously crystallized remains semi-crystalline and contains a substantial glassy phase matrix. Slippage or creep between a decorating paste on the surface of an article and the substrate material which exceeds the rate of colorant ion or atom migration from the paste into the glass-ceramic crystalline space or glassy matrix is likely to result in lateral separation of the paste and result in lateral anomalies of colorant distribution along the surface in the glass-ceramic matrix. If, however, such creep is reduced by matching the glass-ceramic shrinkage by controlled paste shrinkage at heat treatment temperatures (rather than the rapid and deleterious shrinkage of organic based pastes at low temperatures) then improved decorations are likely to result. Anatase titanium dioxide is stable in its crystal form to temperatures encountered in glass-ceramic heat treatment. Anatase titanium dioxide does, nevertheless, transform to rutile and thus shrink in volume in the presence of zinc oxide at temperatures corresponding to preferred glass-ceramic crystallization temperatures. It is therefore speculated that, unlike the prior art diluents which are selected as not reacting with semi-crystalline glass-ceramics, the anatase titanium dioxide may undergo reaction or transformation due to the zinc oxide commonly found in glass-ceramics and that such transformation contributes to improved uniformity of colorant ion or atom migration into the crystal lattice or glassy matrix of a glass-ceramic.

DESCRIPTION OF THE PREFERRED EMBODIMENTS

An amorphous body of crystallizable glass-ceramic material is melted and formed into a flat sheet from a batch so composed that the ultimate composition of the sheet is:

| | | |
|---|---|---|
| $SiO_2$ | 70.05 | percent by weight |
| $Al_2O_3$ | 19.80 | |
| $TiO_2$ | 1.45 | |
| $ZrO_2$ | 1.60 | |
| $Sb_2O_3$ | .50 | |
| $Li_2O$ | 3.8 | |
| $Na_2O$ | .5 | |
| $K_2O$ | .2 | |
| $Cl_2$ | .1 | |
| $ZnO$ | 1.7 | |
| $F_2$ | .3 | |

The making of such glassy materials is taught by U.S. Pat. No. 3,428,513 and an apparatus for forming of such glassy materials into a flat sheet is taught by copending U.S. Application, Ser. No. 796,713 filed Feb. 5, 1969 and assigned to the assignee of this invention. The melting and forming techniques are to a great extent those which are known per se for melting in a refractory furnace and rolling a ribbon or sheet of glass according to the plate method; but the process requirements necessitated for melting a glass having the required composition, such as higher melting temperature, are disclosed in the above-mentioned references. Following forming, the glassy sheet is cooled and surfaced by grinding and polishing, or the sheet may be decorated without surfacing.

A decorating paste is prepared using palladium as a colorant metal and anatase titanium dioxide as a diluent. A dry mixture is prepared having 0.4 percent by weight elemental palladium present as an oxide or salt or as an organic compound, such as dichlorobisdi-n-butylsulfide palladium and 98 percent by weight titanium dioxide, which is 98 percent anatase and 2 percent rutile.

A small amount of bismuth may be present, about 0.08 percent by weight of the mixture, to slightly modify the palladium color to a light brown. The remainder is organic filler and trace amounts of metal impurities having no apparent effect upon the performance of the active ingredients. Sufficient pine oil is added to the dry mixture to form a flowable paste which is easy to spread onto the glass-ceramic surface.

Using the decorating paste a design is screened onto the surface by conventional decorating techniques, such as silk screening.

The decorated article is placed in a heat treatment chamber and the temperature steadily raised over about 5 hours from about room temperature to about 1,300°F; the temperature is maintained at about 1,300°F for approximately 8 hours to initiate nucleation of crystallization sites within the glassy body of the article being treated; the temperature is then raised to about 1,950°F and held there for about 3 hours to cause the glass to crystallize throughout the body of the article and to simultaneously integrate the colorant, palladium, and the colorant modifier, bismuth, into the crystalline matrix; the temperature is then reduced as rapidly as possible consistent with avoiding damage to the refractories and structural members of the heating chamber. After the article is cooled a slight residue of titanium dioxide is removed and the article cleaned.

The resulting decorated article is opaque and milky white. The decoration is a light brown of uniform hue, and a sharp demarcation between the area colored by the decoration and the white body of the glass-ceramic is apparent.

EXAMPLE I

A decorating paste is prepared having the following constituents:

1. Colorant and Colorant Modifier     50 grams
   "Dark Brown" A-1454 (Engelhard Industries, Inc. Newark, New Jersey 07029) containing
   | | |
   |---|---|
   | Palladium | 2.26 weight percent |
   | Bismuth | 0.42 weight percent |
   | Organic Residue | remainder |

2. Diluent Titanium Dioxide     450 grams
   | | |
   |---|---|
   | Anatase | 98 ± 1% |
   | Rutile | 1 ± .5% |
   | (X-Ray Diffraction) | |

3. Pine Oil
   "Drakelene Oil" (Hercules, Inc. Drakenfeld Division, Washington, Pa. 15301)     Sufficient to make a paste about one pint The paste is mixed in a roller mill, running through three times.

Additional pine oil is mixed into the paste, if necessary, until the viscosity is about 50,000 cps or until the viscosity appears suitable for screening.

A screen made of 230 mesh perlon supported on a frame and having an open design is placed on the surface of the glass-ceramic article to be decorated. Spacers associated with the frame space the screen about three-sixteenths inch from the glass-ceramic surface. The open design of the screen is sized to compensate for shrinkage of the glass-ceramic during heat treatment.

Decorating paste is placed on the screen, and a squeegee is drawn across the screen forcing the paste through the screen openings onto the glass-ceramic.

The paste, in its decorative configuration on the glass-ceramic article, is air dried for about 30 minutes. While drying is not absolutely necessary it is done to eliminate any stickiness which could result in dirt adherence to the design while placing the article in a heat treatment chamber.

The article is then heat treated to crystallize the glass-ceramic and integrate the colorant into the crystal matrix of the glass-ceramic. The heat treatment schedule is that described above with a total treatment time of about 24 hours.

After removal from the heat treatment chamber and cleaning, tests are conducted to determine the quality and durability of the decoration and to determine the process performance.

The decoration is a uniform light brown color and has well defined edges. The palladium is determined to have penetrated to a depth of about 0.008 inch into the glass-ceramic. The residue is determined to have no measurable palladium or bismuth present and is found to be less than one percent by weight percent anatase and greater than 99 percent by weight percent rutile.

The durability of the decoration is tested by:
a. 100 rubs with a household cleaning powder
b. 25 rubs with a gold eraser
c. 25 rubs with an aluminum bar
d. 3000 revolutions Taber abraser–CS–10F calibrade wheel
e. 15 minutes contact 10 percent citric acid
f. 15 minutes contact 10 percent sulfuric acid
g. 15 minutes contact 10 percent sodium hydroxide
h. firing at 1,300°F for 16 hours with cooking oil in contact
i. heating 1,300°F, maintained for 168 hours No change in design color or quality is observed except some lightening associated with the Taber abraser test.

EXAMPLE II

All of Example I is repeated except that the titanium dioxide used is:

Anatase  80 ± 10%
Rutile   20 ± 10%

All results are the same as Example I except the design has uneven lightness and darkness of color and has a fuzzy "out-of-focus" appearance at its edges.

Other glass-ceramic materials may be decorated according to the method here disclosed. Typical thermally crystallizable glasses, which are primarily crystallizable into a beta-spodumene-like phase and which can successfully be decorated by this method, are the following, as indicated according to their ultimate composition:

TABLE I

| SiO$_2$ | 67.48 | weight percent | 69.4 | weight percent |
|---|---|---|---|---|
| Al$_2$O$_3$ | 20.40 | | 19.0 | |
| TiO$_2$ | 1.75 | | 1.7 | |
| ZrO$_2$ | 1.95 | | 1.4 | |
| Sb$_2$O$_3$ | .32 | | .5 | |
| CaO | 3.50 | | — | |
| Li$_2$O | 3.90 | | 3.8 | |
| Na$_2$O | .40 | | .6 | |
| K$_2$O | .20 | | .2 | |
| Cl$_2$ | .10 | | .1 | |
| P$_2$O$_5$ | — | | 1.4 | |
| ZnO | — | | 1.9 | |

Any glass-ceramic, such as those prepared according to the teachings of U.S. Pat. Nos. 2,920,971 and 2,971,853, may be decorated according to this invention.

The method may be varied to give different color effects. Since the titanium dioxide serves to control the lightness or darkness of the color in a resulting decoration, its fraction in a decorating paste may be suitably varied. When dark colors are desired, titanium dioxide may be present in limited quantities, as low as 50 percent. When a light, subtle color effect is desired, titanium dioxide may be present up to about 99 percent.

Palladium may be replaced by any of the following colorant materials with the indicated color effect:

TABLE II

| Colorant Ion | Color |
|---|---|
| Cr$^{2+}$ | Blue |
| Cr$^{3+}$ | Green |
| Cr$^{6+}$ | Yellow |
| Cu$^{2+}$ | Blue-Green |
| Cu$^+$ | Colorless |
| Co$^{2+}$ | Blue-Purple, Pink |
| Ni$^{2+}$ | Purple, Yellow-Green |
| Mn$^{2+}$ | Colorless, Weak Orange |
| Mn$^{3+}$ | Purple |
| Fe$^{2+}$ | Blue-Green |
| Fe$^{3+}$ | Deep Brown, Weak Yellow |
| Pt | Gray |
| Pd | Gray, Brown |
| Ag | Orange |

Bismuth may be substituted for with other modifiers, such as arsenic and antimony.

While the heat treatment in the preferred embodiment is accomplished in a slightly oxidizing atmosphere, treatment in a reducing atmosphere may be used to vary the resultant color for a given colorant. Peak heat treatment temperature may be as low as 1,600°F and treatment at that temperature may be limited to one hour to produce transparent, rather than translucent or opaque articles. Treatment at higher peak temperatures, up to about 2,200°F, yields articles of increased opacity.

The method is most useful to give good designs with simultaneous crystallization and colorant integration, but improved designs also result for application and integration of the colorants in a separate heat treatment after crystallization.

As should be obvious from the description given, a variety of glass-ceramic materials may be decorated according to this invention, and a variety of colorants, vehicles, forming steps and heat treating conditions are compatible with this invention. Accordingly, it must be understood that the invention is not necessarily limited to the precise formulations and methods described herein.

I claim:

1. A method of stain decorating a ceramic article which shrinks during decorating comprising the steps of:
   a. mixing a colorant, a colorant modifier and titanium dioxide comprising a crystal content of from 0 to 10 percent by weight of the titanium dioxide, rutile, and 90 to 100 percent by weight of the titanium dioxide, anatase, in a mixture having the titanium dioxide present as 50 to 98 percent by weight of the mixture;
   b. adding to the mixture a volatile liquid vehicle in sufficient quantity to form a flowable paste;
   c. applying the paste to a ceramic article in a desired design; and
   d. heating the paste in contact with the ceramic article causing the paste and ceramic to shrink maintaining contact therebetween and integrating the colorant and modifier into the shrinking ceramic from the shrinking paste in contact therewith and leaving a residue of titanium dioxide substantially converted to rutile titanium dioxide during said heating.

2. The method of decorating a ceramic article of claim 1 wherein the article is a glass-ceramic article.

3. The method of decorating a glass-ceramic article of claim 2 wherein:
the colorant is selected from the group consisting of iron, nickel, cobalt, platinum, palladium and compounds thereof.

4. The method of decorating a glass-ceramic article of claim 2 wherein:
the colorant is palladium; and the colorant modifier is bismuth.

5. The method of decorating a glass-ceramic article of claim 2 wherein:
a. the paste is applied to an uncrystallized glass-ceramic article; and
b. the paste is heated in contact with the glass-ceramic article to a temperature and for a time sufficient to crystallize the glass-ceramic simultaneously integrating the colorant and colorant modifier of the paste into the glass-ceramic.

6. The method of decorating a glass-ceramic article of claim 2 wherein the glass-ceramic has a composition expressed as percent by weight of:

| | | | | |
|---|---|---|---|---|
| $SiO_2$ | from | 67 | to | 71, |
| $Al_2O_3$ | from | 18 | to | 21, |
| $TiO_2$ | from | 1.4 | to | 5.0, |
| $ZrO_2$ | from | 0 | to | 2.0, |
| $Sb_2O_3$ | from | 0 | to | 1.0, |
| $Li_2O$ | from | 2.5 | to | 4.0, |
| $Na_2O$ | from | 0 | to | 1.0, |
| $K_2O$ | from | 0 | to | 1.0, |
| $Cl_2$ | from | 0 | to | 0.2, |
| ZnO | from | 0.5 | to | 2.0, |
| $F_2$ | from | 0 | to | 0.5, |
| MgO | from | 0 | to | 3.0, |
| CaO | from | 0 | to | 4.0, and |
| $P_2O_5$ | from | 0 | to | 1.5. |

* * * * *